(12) United States Patent
Stirniman et al.

(10) Patent No.: US 6,214,410 B1
(45) Date of Patent: Apr. 10, 2001

(54) VACUUM ASSISTED LUBRICATION OF MAGNETIC RECORDING MEDIA

(75) Inventors: Michael Joseph Stirniman; Samuel John Falcone, both of San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/131,875

(22) Filed: Aug. 10, 1998

Related U.S. Application Data

(60) Provisional application No. 60/058,285, filed on Sep. 9, 1997.

(51) Int. Cl.[7] ........................................................ B05D 5/12

(52) U.S. Cl. ............... 427/131; 427/255.14; 427/255.39; 427/255.6; 427/255.7; 427/294; 427/407.1

(58) Field of Search ...................................... 427/131, 130, 427/129, 294, 255.14, 255.39, 255.6, 255.7, 407.1

(56) References Cited

U.S. PATENT DOCUMENTS

| | | | |
|---|---|---|---|
| 4,655,167 | * | 4/1987 | Nakamura et al. . |
| 4,737,415 | * | 4/1988 | Ichijo et al. . |
| 5,562,965 | | 10/1996 | Gui et al. . |

FOREIGN PATENT DOCUMENTS 61-113119 * 5/1986 (JP) .

* cited by examiner

Primary Examiner—Bernard Pianalto
(74) Attorney, Agent, or Firm—McDermott, Will & Emery

(57) ABSTRACT

A lubricant topcoat is applied to a magnetic recording medium under vacuum, thereby eliminating oxidative degradation, increasing lubricant transport properties to the disc surface, increasing uniformity and enabling control of the lubricant molecular weight distribution. Embodiments include positioning the magnetic recording medium in a deposition chamber in communication with a source chamber containing the lubricant and evacuating the chambers to subatmospheric pressure. A heater, attached to the source chamber, elevates the temperature of the lubricant within the source chamber so that the lubricant flows from the source chamber to the deposition chamber and deposits on the magnetic recording medium.

18 Claims, 4 Drawing Sheets

VACUUM ASSISTED LUBRICATION OF MAGNETIC RECORDING MEDIA

RELATED APPLICATION

This application claims priority from provisional patent application Ser. No. 60/058,285 filed Sep. 9, 1997, entitled "VACUUM ASSISTED VAPOR LUBRICATION OF THIN FILM MEDIA" the entire disclosure of which is incorporated herein by reference.

FIELD OF THE INVENTION

The present invention relates to the recording, storage and reading of magnetic data, particularly rotatable magnetic recording media. The present invention is particularly applicable to thin film magnetic discs having textured surfaces and a lubricant topcoat for contact with cooperating magnetic transducer heads.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

A typical longitudinal recording medium is depicted in FIG. 1 and comprises a substrate 10, typically an aluminum (Al)-alloy, such as an aluminum-magnesium (Al-Mg)-alloy, plated with a layer of amorphous nickel-phosphorus (NiP). Alternative substrates include glass, glass-ceramic materials and graphite. Substrate typically contains sequentially deposited on each side thereof a chromium (Cr) or Cr-alloy underlayer 11, 11', a cobalt (Co)-base alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective overcoat 13, 13', typically containing carbon, are usually deposited by sputtering techniques performed in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is applied over the protective layer to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

Magnetic recording media are typically lubricated by applying a topcoat lubricant including perfluoroalkylpolyethers or their derivatives. Conventionally, these lubricants are applied by a dip lubrication method, which method involves dissolving the lubricant in a solvent to form a lubricant solution and submerging the recording media in the lubricant solution to form a topcoat thereon. Dip lubrication processes consumes large quantities of solvent and are economically and environmentally costly. Thus, to overcome the inherent deficiencies of conventional lubrication processes, solvent free processes which provide high performance topcoat lubricants are highly sought and desirable.

Gui et al., in U.S. Pat. No. 5,562,965, disclose a process of coating thin film discs by vapor depositing a terminally finction perfluoroalklpolyether lubricant on the disc Requiring high temperature and amient pressure. However, deposition of lubricants under the conditions of elevated temperature and ambient pressure introduces a variety of deleterious results in the performance of the applied topcoat lubricant. For example, under such conditions lubricants may experience oxidative degradation and, consequently, the deposited lubricants do not achieve optimum performance. Further, it is extremely difficult to deposit uniform coatings and to control the thickness of the deposited lubricant layer under such deposition conditions.

In view of the criticality of the lubricant topcoat, there is a continuing need for improved lubricant stiction and wear performance. There is also a need for an improved process of uniformly applying a topcoat lubricant to the surface a recording media to achieve optimum lubricant performance.

DISCLOSURE OF THE INVENTION

An object of the present invention is a method of manufacturing a magnetic recording medium having a lubricant topcoat exhibiting good stiction and wear resistance.

Another aspect of the present invention is an apparatus for depositing a lubricant topcoat on a magnetic recording medium at a pressure below atmospheric pressure.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a method of manufacturing a magnetic recording medium, the method comprising depositing a lubricant topcoat on a magnetic recording medium under vacuum.

Another aspect of the present invention is a method of manufacturing a magnetic recording medium, the method comprising: providing a magnetic recording medium in a deposition chamber; providing a lubricant in a source chamber, which source chamber communicates with the deposition chamber; evacuating the deposition chamber and the source chamber to a pressure below atmospheric pressure; and heating the lubricant in the source chamber so that the vaporized lubricant flows from the source chamber to the deposition chamber and deposits the lubricant topcoat on a surface of the magnetic recording medium.

A further aspect of the present invention is an apparatus comprising: a deposition chamber for containing a magnetic recording medium; and means for depositing a lubricant topcoat on a surface of the magnetic recording medium at a pressure below atmospheric pressure.

An other aspect of the present invention is an apparatus comprising: a deposition chamber for containing a magnetic recording medium; a source chamber for containing a lubricant and in communication with the deposition chamber; a vacuum source connected to the apparatus for reducing the pressure in the deposition chamber and in the source chamber below atmospheric pressure; and a heater associated with the source chamber for elevating the temperature of the lubricant therein so that it flows from the source chamber to the deposition chamber and deposits a lubricant topcoat on a surface of the magnetic recording medium.

Additional objects and advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The various features and advantages of the present invention will become more apparent as a detailed description of the embodiments thereof is given with reference to the appended figures described below.

DESCRIPTION OF THE INVENTION

Figure 1:
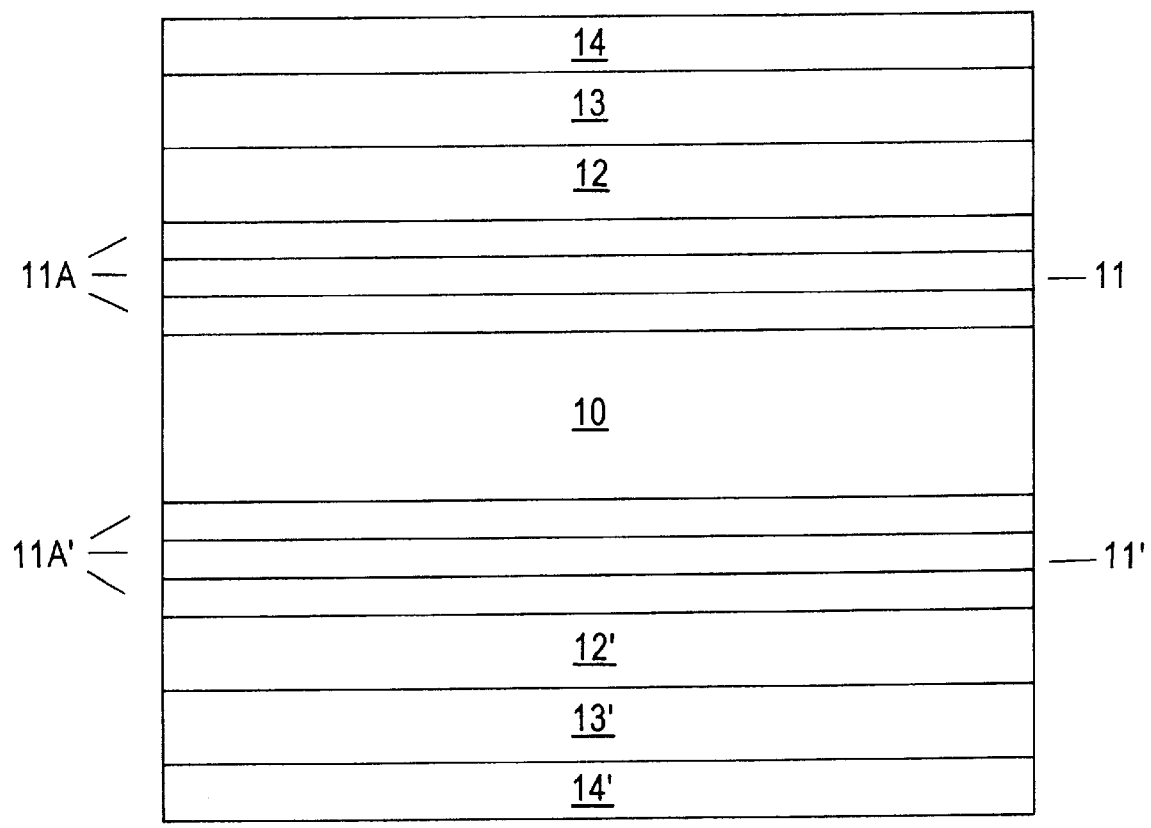
FIG. 1 schematically depicts a magnetic recording medium structure to which the present invention is applicable.

The present invention stems from the discovery that depositing a lubricant topcoat on a magnetic recording medium at sub-atmospheric pressure leads to unexpected and considerable control over the deposited topcoat lubricant. Embodiments of the present invention comprise suspending a magnetic recording medium in a deposition chamber and providing a lubricant in a source chamber. The deposition and source chambers can be constructed of any material which will function at sub-atmospheric pressures and does not interfere with the deposition process, and does not adversely affect the desired properties of the resulting product, e.g. glass, ceramic or metal. A vacuum source is employed to evacuate the deposition and source chambers to a pressure below atmospheric pressure, e.g. a pressure less than about 760 Torr. The temperature of the lubricant in the source chamber is then elevated above the temperature of the magnetic recording medium in the deposition chamber, which elevated temperature causes vaporized lubricant in the source chamber to flow from the source chamber to the deposition chamber and condense on a surface of the magnetic recording medium to form a lubricant topcoat. After sufficient time has elapsed to deposit a topcoat having a substantially uniform thickness substantially completely covering the surface of the recording medium, the deposition chamber can be vented to the atmosphere, or vented with a desired gas. The magnetic recording medium is then removed and the process repeated.

In accordance with embodiments of the present invention, the deposition and source chambers can be evacuated substantially concurrently to substantially the same relative pressure of about 100 Torr to about $10^{-10}$ Torr. After evacuating the deposition and source chambers to the desired pressure, the source chamber can be isolated from the deposition chamber and the vacuum source employing a conventional valve. Subsequent heating of the lubricant in the source chamber causes the pressure in the source chamber to increase relative to the pressure in the deposition chamber. By then opening the valve, lubricant vapor in the source chamber will flow from the source chamber to the deposition chamber. Since the deposition chamber is at a lower temperature and pressure, the heated lubricant from the source chamber deposits on the magnetic recording medium within the deposition chamber. The valve is opened for a period of time sufficient to deposit the lubricant topcoat at a desired uniform thickness. Thereafter, the valve is closed, the deposition chamber vented, the recording medium removed and the method steps repeated.

In an embodiment of the present invention, the vacuum source can be isolated from the apparatus employing another valve positioned between the vacuum source and the apparatus. By closing such a valve, the vacuum source can be isolated from the deposition chamber prior to exposing the magnetic recording medium to lubricant vapor in the deposition chamber.

Practical considerations may require application of the vacuum to the deposition chamber during which the lubricant is heated in the source chamber and to ensure an adequate pressure differential between the two chambers. An embodiment of the present invention includes the use of a valve between the deposition chamber and the vacuum source.

According to the present invention, it is understood that the deposition of a lubricant topcoat on a surface of a magnetic recording medium at sub-atmospheric pressure yields improved control over the deposited topcoat layer.

The amount, quality and molecular weight of the lubricant vapor which flows from the source chamber to the deposition chamber is dependent upon the relative pressure difference and the relative temperature difference between the two chambers.

It is particularly effective to reduce the pressure in the deposition chamber to within the range of about 10 Torr to about $10^{-10}$ Torr, e.g., within the range of about $10^{-3}$ Torr to about $10^{-9}$ Torr. Further, by elevating the temperature of the lubricant in the source chamber, the pressure of the source chamber is increased relative to the deposition chamber. Embodiments of the present invention include elevating the temperature of the lubricant in the source chamber to greater than about 35° C. but less than about 300° C., e.g., a temperature within the range of about 120° C. to about 220° C. By elevating the temperature of the lubricant in the source chamber, the pressure in the source chamber is also elevated. Embodiments of the present invention include evacuating the source chamber to a pressure of about 700 Torr to about $10^{-5}$ Torr, e.g., about 100 Torr to about 0.01 Torr.

The temperature differential between the two chambers is achieved by elevating the temperature of the lubricant in the source chamber. However, the temperature of the deposition chamber can also be increased above room temperature, e.g., to about 30° C. to about 200° C., provided that the magnetic recording medium within the deposition chamber is at a lower temperature than that of the lubricant in the source chamber.

Further control of the rate and quality of the deposition of the lubricant on the surface of the magnetic recording medium can be regulated by interposing yet another valve between the chambers, e.g., a conductance controller valve. The controller valve can be operated at a predetermined position so that the rate of lubricant deposition is retarded constantly throughout the process. The controller valve can also be operated to vary the flow of lubricant during deposition on the surface of the magnetic recording medium.

Lubricants which can be employed in the practice of the present invention can comprise any compound that can be vacuum deposited on the surface of a magnetic recording medium to form a topcoat lubricant thereon. Conventional lubricants suitable for use in the practice of the present invention comprise fluorinated organic compounds, including fluoroalkylpolyethers and perfluoroalkylpolyethers. Commercial perfluoroalkylpolyether are available under such trade names as Fomblin Zdol, Zdol-TX; Fomblin Z-03, Fomblin Z-15, Fomblin Z-25; (all from Ausimont); Demnum (Daikin) and Krytox (Dupont).

Suitable lubricants for use in the practice of the invention may also include low vapor pressure monomeric oils, such as alkanes, halo-substituted alkanes and perfluoroalkanes, and solids, such as stearic acid.

Embodiments of the present invention include modifying a lubricant prior to its use in the deposition process. For example, a lubricant can be fractionated by distillation or chromatography prior to use to remove an undesired molecular weight fraction of the lubricant mixture or to remove any undesired components or impurities.

Given the objects of the present invention, the temperature, pressure and the duration of exposure of the magnetic recording medium can be easily optimized in a particular situation to achieve a desired or optimal coating thickness. For example, it is desirable to deposit a lubricant topcoat of a thickness of at least about 0.5 nm, but less than about 5 nm, e.g., about 1 nm to about 4 nm.

Lubricant topcoats on magnetic recording media formed in accordance with the present invention have been evaluated with respect to stiction, 1 RPM stiction and stress CSS performance on thin film and magnetic recording disks.

Figure 2:
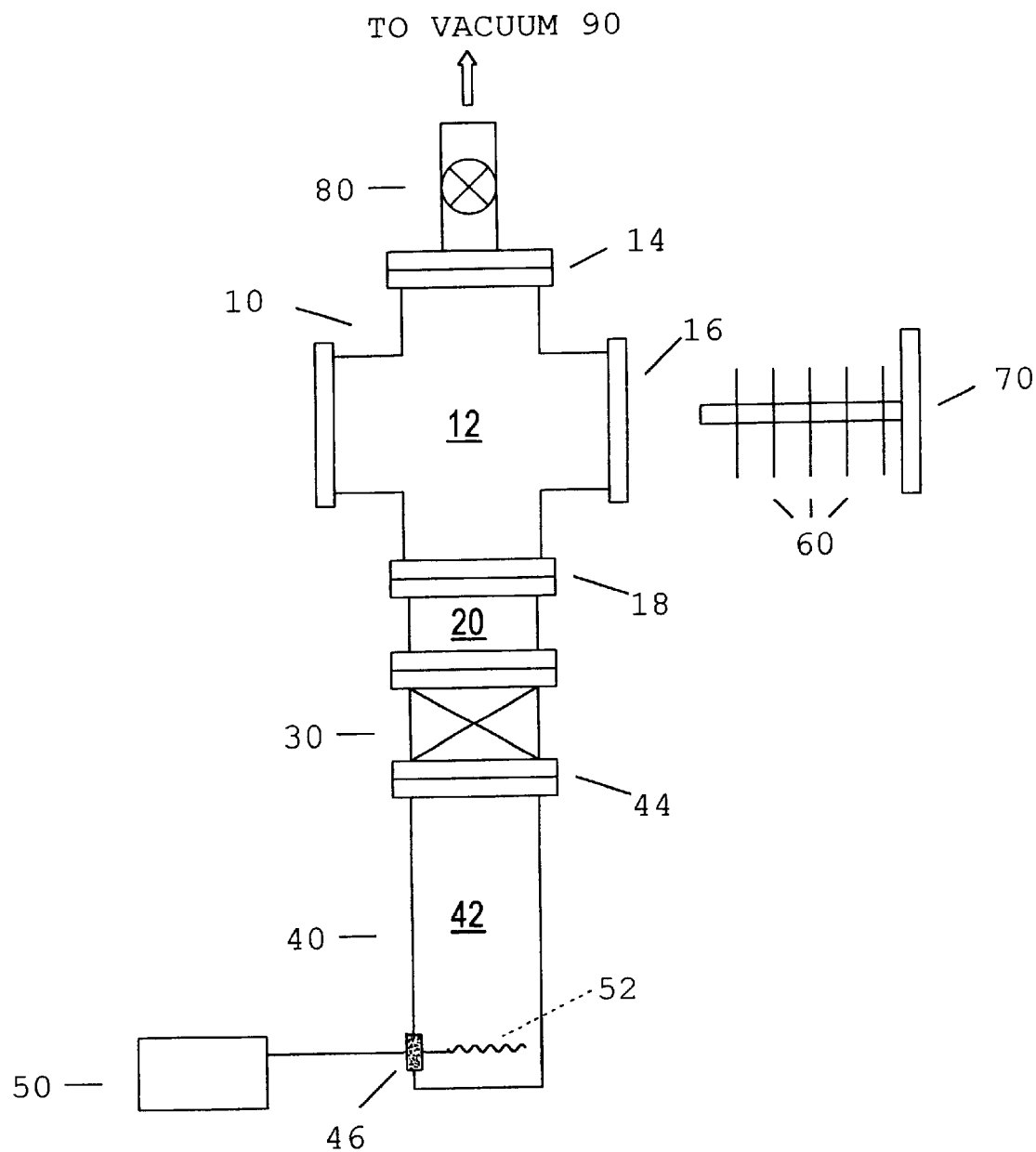
FIG. 2 depicts a lubrication apparatus in accordance with an embodiment of the present invention.

Referring to FIG. 2, an embodiment of the present invention for depositing a lubricant topcoat on a surface of a magnetic recording medium comprises a deposition chamber 10 having a hollow body 12, a first opening 14, a second opening 16 and a third opening 18.

First opening 14 is sealably connected to valve 80 and in communication with a vacuum source 90 (not shown) through valve 80. Valve 80 is capable of completely or partially isolating deposition chamber 10 from the vacuum source, e.g., valve 80 can be a high vacuum valve. Valve 80 can also be designed simultaneously isolate the vacuum source and vent deposition chamber 10 to the ambient atmosphere or vent deposition chamber 10 to a desired gas (not shown).

Embodiments of the present invention comprise the use of any conventional vacuum source capable of evacuating the apparatus to a pressure below atmospheric, e.g., a turbo pump and a liquid nitrogen trap.

Second opening 14 of deposition chamber 10 is adapted to receive a holder 70, such as a mandrel holder, having magnetic recording media 60 mounted thereon. Holder 70 is sealably attached to opening 16 of body 12 such that deposition chamber 10 can reach a desired sub-atmospheric pressure.

Third opening 18 communicates with a controller valve 20, such as a conductance controller. Controller valve 20 can be manually driven or motor driven. Various types of conventional controller valves can be employed in practicing the present invention, such as those available from the Kurt Lesker Co.

Controller valve 20 is in further communication with valve 30 and source chamber 40. Valve 30 is capable of completely or partially isolating source chamber 40 from deposition chamber 10, e.g., a gate valve. Valve 30 can also be designed to vent source chamber 40 to the ambient atmosphere or vent source chamber 40 to a desired gas (not shown). Various types of conventional valves can be employed in practicing the present invention, such as those available from the Kurt Lesker Co.

Source chamber 40 comprises a hollow body 42 and a first opening 44 detachably connected to valve 30. The lubricant can be introduced into source chamber 40 through first opening 44 prior to attaching source chamber 40 to the apparatus. Alternatively, source chamber 40 can be provided with a separate sealable opening (not shown) for the introduction of the lubricant.

Heater 50 is connected to source chamber 40 for heating the lubricant contained in source chamber 40. Heater 50 can comprise any conventional heating means, inclusive of a conventional temperature controller, heating element and thermocouple. As shown, heater 50 includes heating element 52 disposed within source chamber 40 through opening 46. Alternatively, the heater can be attached to body 42 and transmit heat convectionally through body 42 to the lubricant contained therein.

EXAMPLES

Several magnetic recording discs can be loaded onto a mandrel and placed into a deposition chamber. Commercially available Fomblin Zdol 2000, a perfluoroalkylpolyether lubricant obtained form Ausimont of Thorofare, N.J., can be placed in a source chamber and the conductance controller set to a predetermined position.

Initially, the entire apparatus can be evacuated to a pressure of about $10^{-7}$ Torr by a vacuum source comprising a turbo pump and a liquid nitrogen trap. The source chamber can then be isolated from the apparatus by closing a gate valve. The lubricant, within the source chamber, can be heated to about 180° C. by a heater comprising a temperature controller, a heating element and a thermocouple.

After the lubricant reaches the operating temperature of about 180° C., the vacuum source can be isolated from the apparatus by closing a high vacuum valve attached to the deposition chamber. The gate valve can then be opened to permit lubricant vapor from the source chamber to flow past the conductance controller into the deposition chamber and deposit on a surface of the magnetic recording disc.

After about one minute, the gate valve can be closed to isolate the source chamber. The deposition chamber can then be vented to the ambient atmosphere and the discs removed.

Figure 3:
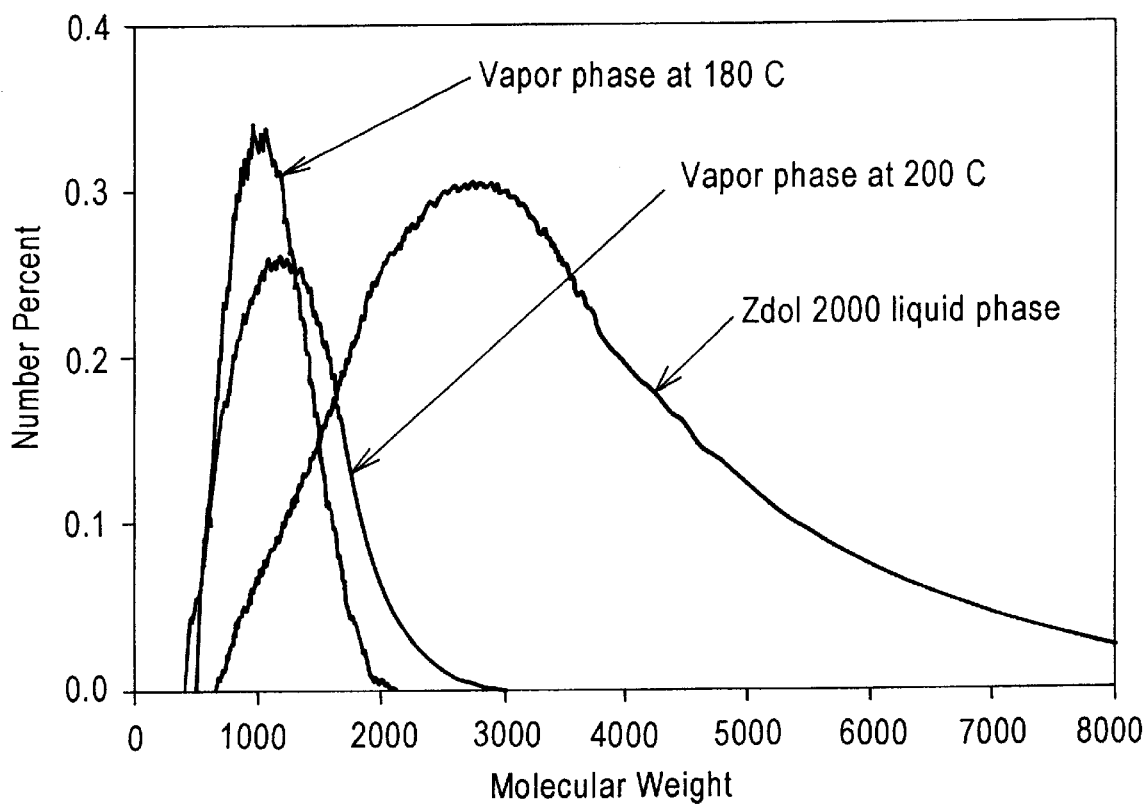
FIG. 3 presents comparative GPC data of lubricant vapor phase molecular weight distributions in accordance with an embodiment of the present invention at various temperatures vis-a-vis the GPC data of the original lubricant.

In a separate experiment, the above procedure can be followed except the lubricant in the source chamber can be heated to 200° C. prior to exposing the discs. A comparative analysis of the GPC data of the lubricant vapor of the starting Zdol 2000 is shown in FIG. 3.

Figure 4:
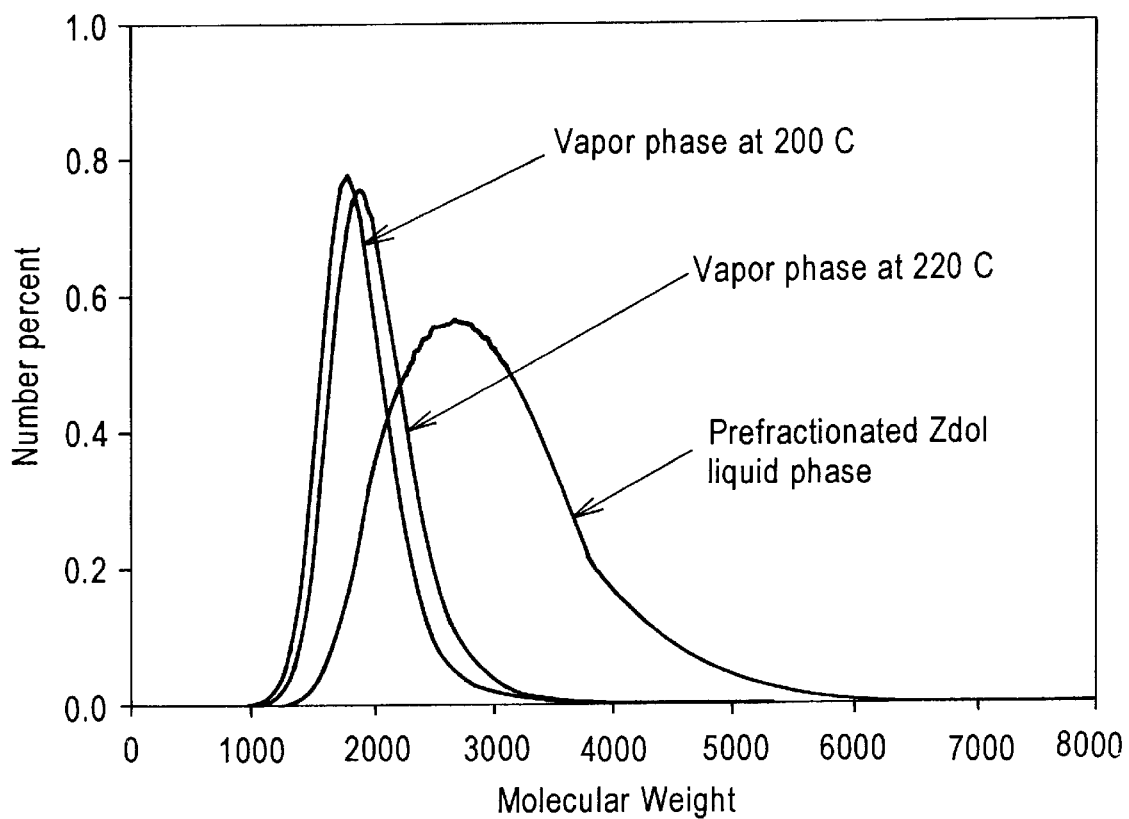
FIG. 4 presents comparative GPC data of pre-fractionated lubricant vapor phase molecular weight distributions in accordance with an embodiment of the present invention vis-a-vis the GPC data of the starting lubricant.

In a separate experiment, the above procedure can be followed except that a pre-fractionated Zdol lubricant can be employed as the lubricant in the source chamber and the pre-fractionated Zdol can be heated to either 200° C. or 220° C. prior to exposing the discs. FIG. 4. illustrates a comparative analysis of the GPC data of the lubricant vapor at different temperatures vis-a-vis the GPC data of the starting, pre-fractionated Zdol lubricant.

The present invention is applicable to the manufacture of any of various types of magnetic recording media, including high density magnetic recording media. The present invention is not limited to any particular type of magnetic recording medium, and includes any of various magnetic recording media, such as those wherein the substrate or a subsequently deposited layer has been textured, as by mechanical treatment or laser techniques, and the textured surface substantially reproduced on subsequently deposited layers. A lubricant can be deposited in accordance with the present invention to form a topcoat, such as topcoat 14 on the magnetic recording media depicted in FIG. 1, but not necessarily limited thereto.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A method of depositing a lubricant topcoat on a magnetic recording medium, the method comprising:
   providing a magnetic recording medium in a deposition chamber;
   providing a lubricant in a source chamber, which source chamber communicates with the deposition chamber;
   evacuating the deposition chamber and the source chamber, with a vacuum source, to a pressure below atmospheric;
   isolating the source chamber from the deposition chamber and the vacuum source after evacuation;
   heating the lubricant in the source chamber so that the pressure in the source chamber is greater than the pressure in the deposition chamber; and
   exposing the magnetic recording medium in the deposition chamber to the heated lubricant for a time sufficient to deposit the lubricant topcoat on the surface of the magnetic recording medium.

2. The method according to claim 1, comprising depositing the lubricant topcoat at a pressure no greater than about 100 Torr.

3. The method according to claim 1, comprising:
   heating the lubricant in the source chamber so that the lubricant flows from the source chamber to the deposition chamber and deposits the lubricant topcoat on the surface of the magnetic recording medium.

4. The method of claim 3, wherein the lubricant comprises a fluorinated organic compound.

5. The method of claim 3, comprising maintaining the source chamber at a pressure of about 100 Torr to about 0.01 Torr.

6. The method of claim 3, comprising controlling the flow of the lubricant between the source chamber and the deposition chamber.

7. The method according to claim 6, wherein the flow of the lubricant between the source chamber and the deposition chamber is controlled with a conductance controller valve.

8. The method of claim 3, comprising heating the lubricant in the source chamber to a temperature of about 3520 C. to about 300° C.

9. The method of claim 3, further comprising:
   heating the deposition chamber to a temperature of about 30° C. to about 200° C., such that the recording medium in the deposition chamber is at a lower temperature than the temperature of the lubricant in the source chamber.

10. The method of claim 3, comprising maintaining the deposition chamber at a pressure of about 10 Torr to about $10^{-10}$ Torr.

11. The method of claim 1, further comprising:
    isolating the vacuum source from the deposition chamber before exposing the magnetic recording medium in the deposition chamber.

12. The method of claim 1, comprising exposing the magnetic recording medium for a time sufficient to deposit the lubricant topcoat at a thickness of about 0.5 nm to about 5 nm.

13. The method according to claim 1, wherein the magnetic recording media is a disk comprising first and second opposing sides.

14. The method according to claim 13, wherein the lubricant is deposited on the first and second sides of the disk.

15. A method of depositing a lubricant topcoat on a magnetic recording medium, the method comprising:
    providing a magnetic recording medium in a deposition chamber;
    providing a heated lubricant in a source chamber, which source chamber communicates with the deposition chamber;
    evacuating the deposition chamber and the source chamber, with a vacuum source, to a pressure below atmospheric; and
    exposing the magnetic recording medium in the deposition chamber to the heated lubricant for a time sufficient to deposit the lubricant topcoat on the surface of the magnetic recording medium; wherein the lubricant is a pre-fractionated perfluoroalkyl polyether.

16. The method according to claim 15, wherein the perfluoroalkyl polyether is a pre-fractionated perfluoroalkyl polyether.

17. The method according to claim 15, further comprising isolating the source chamber from the deposition chamber and the vacuum source.

18. The method according to claim 17, further comprising heating the lubricant in the source chamber so that the pressure in the source chamber is greater than the pressure in the deposition chamber after isolating the source chamber from the deposition chamber and vacuum source.

* * * * *